United States Patent [19]

Barton et al.

[11] 3,870,818

[45] Mar. 11, 1975

[54] SOLID STATE DIGITAL AUTOMATIC VOICE RESPONSE SYSTEM

[75] Inventors: William A. Barton; John E. Stork, both of Malibu, Calif.

[73] Assignee: Speech Technology Corporation, Santa Monica, Calif.

[22] Filed: Aug. 24, 1973

[21] Appl. No.: 391,297

[52] U.S. Cl. .............................. 179/1 SM, 340/27 R

[51] Int. Cl. .............................................. G10l 1/04

[58] Field of Search ........ 179/1 SA, 15.55 R, 1 SM, 179/1 SG; 340/27 R, 152, 148, 22

[56] References Cited

UNITED STATES PATENTS

| | | | |
|---|---|---|---|
| 3,158,685 | 11/1964 | Gerstman et al. | 179/1 SG |
| 3,581,014 | 8/1971 | Vogel et al. | 340/27 R |

*Primary Examiner*—William C. Cooper
*Assistant Examiner*—Tommy P. Chin

[57] ABSTRACT

A voice response device similar to an annuciator includes comprising individual circuits each capable upon triggering of generating speech synthesizing signals corresponding to a given word or phrase. Digital code groups represent the permanently stored words or phrases. A particular code group is generated and applied to the storage unit to reproduce the corresponding message only if a given condition occurs. The voice response system is ideally suited to automobiles wherein a condition such as an unfastened seat belt will automatically generate a digital code group which when applied to the storage unit results in an audible formation of a message such as "fasten seat belt".

2 Claims, 2 Drawing Figures

| Triggering Code Group | Permanently Stored Corresponding Message |
|---|---|
| 001 | Brake Fluid Low |
| 010 | Oil Pressure Low |
| 011 → | Fasten Seat Belt |
| 100 | Gasoline Low |

SOLID STATE DIGITAL AUTOMATIC VOICE RESPONSE SYSTEM

This invention relates to automatic voice response systems similar to annunciator systems but wherein a voice message is wholly electronically synthesized in response to a given condition.

BACKGROUND OF THE INVENTION

Annunciator systems are well known in the art and usually take the form of pre-recorded voice messages wherein any one of the voice messages may be automatically selected and played back in response to a given condition. These systems usually involve an electro-mechanical combination of elements such as tape recorders or the like for storing the various messages from which a particular message is selected in response to a particular condition occuring.

Because the pre-recorded messages are on recording mediums, there is required mechanical moving parts such as recording heads or reels and the like in order to reproduce the message. Further, in some cases mechanical components are provided to select among the various recorded messages the proper one to be reproduced. As a consequence, most systems as are presently in operation are expensive to manufacture and maintain and furthermore are often bulky and heavy.

BRIEF DESCRIPTION OF THE PRESENT INVENTION

The present invention contemplates an automatic voice response system which performs the same function as an annunciator but which avoids minimizes the use of mechanically moving parts of all to the end that it can be manufactured at considerably less expense than units capable of performing a similar function and can also be packaged in a very compact space.

More particularly, the system comprises a permanent word message storing means responsive to a given digital input code group to generate speech synthesizing signals corresponding to a given word message represented by the code group. Different code groups trigger the generation of different speech synthesizing signals corresponding to different messages represented by the different code groups.

A speech synthesizing means in turn is responsive to the speech synthesizing signals to audibly generate words constituting the corresponding word message. Means are also provided responsive to given different conditions for generating and passing to the permanent word message storing means a given digital code group representing a word message describing a corresponding one of the different conditions. The result is that a person is automatically audibly advised of the existence of any of said different conditions.

BRIEF DESCRIPTION OF THE DRAWINGS

A better understanding of the present invention will be had by referring to the accompanying drawings in which.

DETAILED DESCRIPTION OF THE INVENTION

Figures 1, 2:
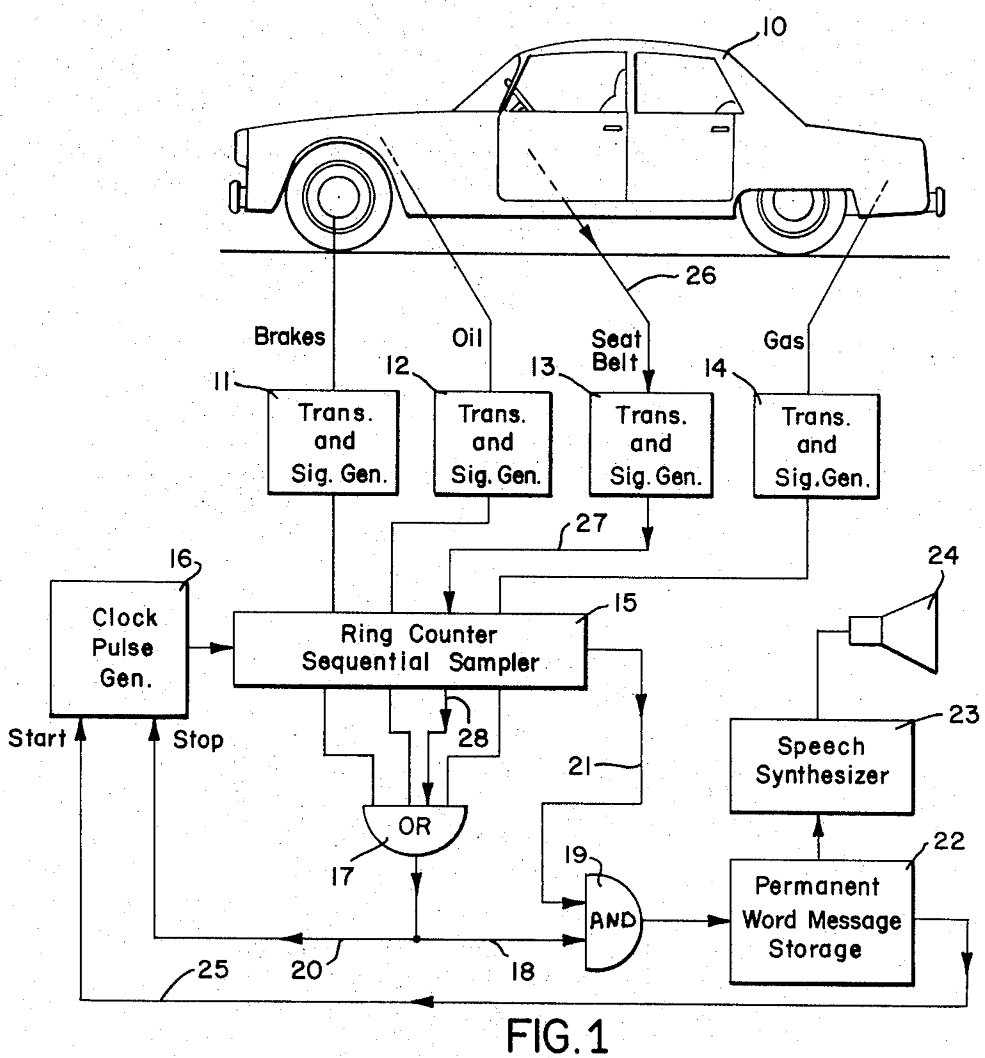
FIG. 1 is a block diagram of the digital automatic voice response system of the present invention as utilized in an automobile to audibly indicate various different conditions that might exist.
FIG. 2 is a table illustrating sample messages and corresponding code groups representing the messages for use in the system of FIG. 1.

Referring to FIG. 1 the voice response system is shown in block diagram in conjunction with an automobile 10 for sounding audible messages in response to various different conditions which may occur in the automobile. Towards this end, there are provided transducers 11, 12, 13 and 14 which detect given conditions in the car such as, for example, the brake fluid pressure, the oil pressure, whether or not a seat belt is fastened, and whether or not the gasoline tank is low.

Essentially, each transducer provides a binary output signal on its output line in response to the existence of the particular condition with which it is associated.

The respective output line from the transducer passes to a sequential sampling means 15 which may incorporate a ring counter and functions to effect repeated monitoring of the output lines from the transducer. The sequential sampler is under control of a clock pulse generator 16. A simple type of sampler might comprise, for example, four solid state switches which are sequentially closed under control of the clock pulses. Thus, the existence of a signal on any one of the transducer output lines will be communicated to a corresponding output line of the sampler 15, these latter output lines all passing through an OR circuit 17 to the first input 18 of an AND gate 19.

The same signal from the OR circuit 17 is also passed along a line 20 to stop the clock pulse generator 16 so that the ring counter is stopped at the monitored position. In the example shown, the ring counter 15 has four monitoring positions or states. A unique digital code group in the counter is established at each state so that when the counter is stopped, the digital code group corresponding to its state is passed along an output line 21 to the second input of the AND gate 19. This digital code group is passed through the gate 19 which is enabled by the signal on line 18, and utilized to trigger a permanent word message storage means 22 which provides speech synthesizing signals to a speech synthesizer 23 for audible reproduction in a loud speaker 24.

Thus, whenever one of the output lines from the transducer has a binary signal indicating that a certain condition exists, this signal is utilized to stop the clock pulse generator 16 by means of the line 20.

When the code group signal on line 21 corresponding to the stopped state of the counter has triggered the appropriate word message in the storage means 22 for audible reproduction, a start signal is generated in the storage means 22 which is passed along a line 25 to start the clock pulse generator 16 so that sampling or monitoring of the various output lines from the transducers will be resumed.

FIG. 2 illustrates a simple digital code group representing particular word messages to be reproduced. Thus, assuming that there are eight or less individual messages involved, it is only necessary to provide three digital bits for each code group. In the event a greater number of words or messages are to be stored in the permanent word message storage means 22, more than three bits may be used to comprise each code groups. For the digital system shown, the total number of phrases that may be stored is $2^n$ where $n$ represents the number of bits making up any one code group.

The permanent word message storage means 22 is comprised of circuits capable of generating speech synthesizing signals when triggered, these signals passing to the speech synthesizer 23 to be reproduced as audible words in the loud speaker 24. The generation of speech synthesizing signals and their audible reproduction is a known technique. See for example, U.S. Pat. Nos. 2,819,341 and 3,158,685. It should be understood that applicant's invention does not reside in synthesizing speech but only in the combination of a speech synthesizer with the various other components described to make up the voice response unit.

OPERATION

In the operation of the particular system described in conjunction with FIG. 1, the various messages stored in the permanent voice message storage means 22 are shown in FIG. 2 with corresponding code groups. Assume that a particular condition exists among the various conditions described in FIG. 1 such as the seat belt not being fastened. In this event, a binary signal will appear on line 26 to the transducer 13 which will generate an output signal on line 27. If the seatbelt is fastened, no signal will appear on the line 27.

When the ring counter sequential sampler 15 closes the circuit between the output line 27 and the corresponding counter output line 28 in its monitoring operation, the signal is passed through the OR circuit 17 to the line 18 and the first input of the AND gate 19. Simultaneously, this same signal passes on the line 20 to stop the clock pulse generator 16 and thus stop the sequential sampler operation so that the ring counter is in a given state.

In the particular example choosen for illustrative purposes, the code group generated on the output line 21 corresponding to this state is the binary code 011 representing the word message FASTEN SEAT BELT.

When the code group 011 passes through the gate 19 which is enabled by the signal on line 18, it is received in the permanent word message storage 22. The particular circuits which generate speech synthesizing signals corresponding to the words FASTEN SEAT BELT, are then sequentially triggered and the corresponding signals generated and passed to the speech synthesizer 23 wherein they are audibly reproduced in the loud speaker 24.

As mentioned heretofore, the permanent word message storage 22 includes a start signal generator responsive to completion of the generation of the speech synthesizing signals so that when the message is complete, the clock pulse generator 16 is started through line 25 to start the sequential sampler and resume the monitoring of the various output lines.

The announcement from the speaker 24 FASTEN SEAT BELT thus alerts a driver of the car of the particular condition involved.

In the event the brake fluid is low or the oil pressure is low or the gasoline low, there will appear signals above a distinct threshold voltage level on the other output lines for the transducers 11, 12 and 14 which signals will stop the counter whose state is then the corresponding binary code to trigger the permanent word message storage 22 and provide for audible generation of the message.

From the foregoing description, it will be evident that the present invention has provided a system which generates actual messages in response to different conditions which in the example chose constitutes the exceeding of given values of operating parameters in a vehicle. Of course the automatic voice response system may be utilized to alert a person of conditions in other environments and thus the particular example set forth is not to be thought of as limiting.

What is claimed is:

1. A digital automatic voice response system comprising, in combination:

a. a plurality of transducers, each transducer having an output line and being responsive to a given condition sensed by said transducer to produce on its output line a binary output signal representing the sensed condition;

b. a word message storage means which permanently stores a plurality of sets of speech synthesizing signals which respectively correspond to various preselected word messages;

c. speech synthesizing means coupled to said storage means and responsive to a set of speech synthesizing signals received from said storage means for generating an audible word message corresponding to the word message stored in said storage means;

said storage means being responsive to a digital code group supplied thereto for generating a set of speech synthesizing signals corresponding to a particular stored word message as indicated by the digital value of said digital code group;

d. sequential sampling means including a clock pluse generator, and a counter responsive to successive pulses from said clock pulse generator to repetitively count through successive states of its counting sequence, said counter having a plurality of output lines respectively corresponding to the output lines from said transducers and being operable in each counting state to couple the corresponding transducer output line to the corresponding counter output line;

said clock pulse generator having start and stop terminals, the stop terminal being coupled to receive a signal from any one of said counter output lines so that the clock pulse generator is stopped and thereby stops the counter in its given state; and said storage means including start signal generating means responsive to the completion of the generation of a set of speech synthesizing signals to pass a start signal to said start terminal, whereby said sequential sampling means is automatically stopped while a message is being delivered and is automatically started on completion of the message.

2. In a signaling system for providing an automatic voice announcement of a condition being monitored, which system includes a plurality of transducers each of which is adapted to produce a signal above a distinct threshold voltage level when a corresponding condition being monitored occurs, and which system also includes permanent word message storage means, a speech synthesizer responsive to signals generated from the storage means for generating a word message, and a loud speaker for announcing the word message, the improvement comprising: sequential sampling means for sampling the outputs of said transducers in sequence;

clock pulse generating means for driving said sequential sampling means;

gating means controlled by said sequential sampling means for initiating the generation by the storage means of signals representing the word message corresponding to the occurrence of the condition being monitored by a particular transducer; and additional gating means controlled by said sequential sampling means for selectively enabling said first-named gating means and for concurrently stopping the operation of said clock pulse generating means until the generation of the word message signals from said storage means has been completed.

* * * * *